United States Patent
Hanyu

(10) Patent No.: US 9,121,752 B2
(45) Date of Patent: Sep. 1, 2015

(54) ACOUSTIC MEASUREMENT DEVICE

(75) Inventor: Toshiki Hanyu, Tokyo (JP)

(73) Assignee: NIHON UNIVERSITY, Tokyo (JP)

( * ) Notice: Subject to any disclaimer, the term of this patent is extended or adjusted under 35 U.S.C. 154(b) by 604 days.

(21) Appl. No.: 12/921,389

(22) PCT Filed: Mar. 5, 2009

(86) PCT No.: PCT/JP2009/000994
§ 371 (c)(1),
(2), (4) Date: Nov. 4, 2010

(87) PCT Pub. No.: WO2009/110239
PCT Pub. Date: Sep. 11, 2009

(65) Prior Publication Data
US 2011/0103601 A1 May 5, 2011

(30) Foreign Application Priority Data

Mar. 7, 2008 (JP) ................................ 2008-057260

(51) Int. Cl.
*H04R 29/00* (2006.01)
*G01H 3/12* (2006.01)
*H04R 1/40* (2006.01)

(52) U.S. Cl.
CPC . *G01H 3/12* (2013.01); *H04R 1/406* (2013.01)

(58) Field of Classification Search
CPC ............ H04R 3/00; H04R 3/005; H04R 3/04; H04R 1/326; H04R 1/38; H04R 1/406; H04R 2201/401; H04R 2201/403; H04R 2201/405; H04R 5/027; H04R 2430/20; H04R 2430/21; H04R 29/004; H04R 29/005; H04R 29/00; H04R 19/016; H04R 25/405; H04R 25/407; G01H 3/12; G01H 3/14; G01H 3/00; G01H 3/125; H04S 2400/15; H04S 7/305; H04S 2420/01; H04S 7/301; G01N 29/11; G01S 3/8036; G01S 3/803; G01S 3/8083; G01S 5/22; G01S 5/20; G01V 1/001; G01V 1/003; G01V 1/16

USPC .............. 381/56, 58, 26, 92, 122; 702/48, 54, 702/103, 137, 138; 700/94
See application file for complete search history.

(56) References Cited

U.S. PATENT DOCUMENTS 5,664,021 A * 9/1997 Chu et al. .......................... 381/92
6,173,059 B1 * 1/2001 Huang et al. ..................... 381/92
(Continued)

FOREIGN PATENT DOCUMENTS

EP          1813956 A1 *  8/2007
JP          63295932 A  * 12/1988
(Continued)

OTHER PUBLICATIONS

"Sanjigen Onkyo Intensity Probe", Shun Oguro, Shozo Anzai, Hideo Suzuki, IEICE Technical Report, Aug. 25, 1992, vol. 92, No. 191 (EA9247-55), pp. 59-62.
(Continued)

*Primary Examiner* — Leshui Zhang
(74) *Attorney, Agent, or Firm* — Well St. John P.S.

(57) ABSTRACT

Provided is an acoustic measurement device capable of reducing the number of microphones while solving a problem of the dependency of interval between microphones on the frequency. The acoustic measurement device comprises a sound reception section (10) and a calculation section (20). The sound reception section includes a plurality of unidirectional microphones. The plurality of microphones of the sound reception section (10) are arranged such that the total sum of the unit vectors each facing the maximum sensitivity direction of the microphone is zero. The calculation section (20) calculates a particle velocity vector or acoustic intensity by multiplying respective unit vectors by measurement values of each of the plurality of microphones of the sound reception section and calculates acoustic information by vector-synthesizing the results.

13 Claims, 3 Drawing Sheets

(56) References Cited

U.S. PATENT DOCUMENTS

| | | |
|---|---|---|
| 6,600,824 B1 | 7/2003 | Matsuo |
| 7,672,196 B1 | 3/2010 | Hanyu |
| 2005/0182627 A1 | 8/2005 | Tanaka et al. |
| 2006/0029233 A1 | 2/2006 | Sommerfeldt et al. |
| 2011/0103601 A1 | 5/2011 | Hanyu |

FOREIGN PATENT DOCUMENTS

| | | |
|---|---|---|
| JP | 2-36318 | 2/1990 |
| JP | 06-194217 | 7/1994 |
| JP | 6-201450 A | 7/1994 |
| JP | 10-097263 | 4/1998 |
| JP | 2000-261900 | 9/2000 |
| JP | 2001-045590 | 2/2001 |
| JP | 2007-054909 | 3/2007 |
| JP | 2007-292667 | 11/2007 |
| JP | 2008-057260 | 3/2008 |
| JP | 2008-249702 | 10/2008 |
| WO | PCT/JP2005/021040 | 5/2006 |

OTHER PUBLICATIONS

Nehori, Arye, Acoustic Vector-Sensor Array Processing, IEEE Transactions on Signal Processing, vol. 42, No. 9, Sep. 1994.

Nutter David B., Leishman Timothy W., Somemrfeldt Scott D., Blotter Jonathan D., "Measurment of sound power and absorption in reverberation chambers using energy density", J Acoust Soc Am, May 2007, vol. 121, No. 5, p. 2700-2710.

Gade, S. "Sound Intensity (Theory)", Technical Review, No. 3, 1982, 42 pages.

* cited by examiner

ACOUSTIC MEASUREMENT DEVICE

CROSS REFERENCE TO RELATED APPLICATION

This is a 35 U.S.C. §371 application of, and claims priority to, International Application No. PCT/JP2009/000994, which was filed on Mar. 5, 2009, and which claims priority to Japanese Patent Application No. 2008-057260, which was filed on Mar. 7, 2008, and the teachings of all the applications are incorporated herein by reference.

TECHNICAL FIELD

The present invention relates to an acoustic measurement device, and more particularly to an acoustic measurement device that uses a plurality of unidirectional microphones to calculate acoustic information such as acoustic intensity.

BACKGROUND ART

Measurement of acoustic intensity has been performed for evaluation of noise or analysis of sound propagation in a concert hall. Unlike acoustic pressure which is a scalar quantity, the acoustic intensity is a vector quantity and includes not only information such as volume, frequency, and waveform of sound from a sound source but also information about direction of sound. That is, not only the volume of sound but also the information as to which direction sound is traveling from can be measured based on the acoustic intensity.

The acoustic intensity is represented by a product of acoustic pressure and particle velocity. The acoustic pressure level can be measured easily, while the particle velocity cannot. Therefore, in general, there has been used a method (P-P method) that uses phase-matched two omnidirectional microphones which are arranged facing or back-to-back each other to determine the particle velocity through a finite difference approximation. However, the handling of the P-P method is not easy, because the P-P method is sensitive to a difference in the sensitivity or phase between the two microphones and the strict management for the interval between the microphones is required. Further, in the P-P method, the interval between the microphones needs to be changed depending on the frequency of sound from a sound source.

To solve the above problems, the present inventor has developed various types of acoustic measurement devices employing a method (C-C method) that uses a plurality of unidirectional microphones arranged in 180 degrees opposite direction in terms of directionality to measure the acoustic intensity using the directional information of the microphones. For example, Patent Document 1 discloses a device capable of calculating a sound source direction and a sound source level using a database of a level difference between microphones arranged in 180 degrees opposite direction.

The present inventor has also developed an acoustic measurement device of the C-C method that uses a reception section including a pair of unidirectional microphones which are arranged in 180 degrees opposite direction on the respective axes of an orthogonal coordinate system to perform predetermined calculation to thereby detect the direction of sound emitted from a sound source without using the database, etc (Japanese Patent Application 2007-054909).

Such an acoustic measurement device of the C-C method can solve an inherent mismatch in the phase characteristics existing between the microphones or dependency of the interval between the microphones on the frequency.

Patent Document 1: International Publication No. 2006/054599 pamphlet

DISCLOSURE OF THE INVENTION

Problems to be Solved by the Invention

In the conventional acoustic measurement device of the C-C method, however, in the case where two-dimensional direction detection is performed, at least four (four channels) unidirectional microphones are used and respective pairs of microphones arranged in 180 degrees opposite direction are arranged such that the lines connecting the respective pairs of microphones cross each other in the x- and y-axis directions about the coordinate origin. Further, in the case where three-dimensional direction detection is performed, at least six (six channels) unidirectional microphones are used and respective pairs of microphones arranged in 180 degrees opposite direction are arranged such that the lines connecting the respective pairs of microphones cross each other in x-, y-, and z-axis directions about the coordinate origin. Then, the acoustic intensity components in the respective axis directions are each calculated based on the difference between each pair of microphones and the addition therebetween followed by synthesis of the calculated intensity components in the respective axis directions, whereby the acoustic intensity is calculated. As described above, in the conventional acoustic measurement device of the C-C method, at least four microphones are required for two-dimensional direction detection and at least six microphones are required for three-dimensional direction detection.

In the case where an application in which an acoustic direction measurement device is incorporated in, e.g., a toy to allow the toy to move or rotate in the direction of a sound source is developed, a configuration that can be achieved at lowest possible cost is desired. Further, in such an application, there may be a case where a higher priority is placed on size reduction than on measurement accuracy. In such a case, the number of microphones used is preferably small; however, as described above, at least four microphones are required for two-dimensional direction detection and at least six microphones are required for three-dimensional direction detection. Under such a circumstance, development of an acoustic measurement device having a simpler configuration has been demanded.

Further, in the conventional acoustic measurement device having a configuration based on the pair of microphones arranged in 180 degrees opposite direction, if one microphone becomes nonfunctional due to some failure, the function of the acoustic measurement device may be lost completely. Thus, application of the conventional acoustic measurement device to a usage requiring robustness has been difficult.

In view of the above situation, an object of the present invention is to provide an acoustic measurement device capable of reducing the number of microphones while solving a problem of the dependency of interval between microphones on the frequency. Another object of the present invention is to provide an acoustic measurement device capable of enhancing robustness by increasing the number of microphones.

Means for Solving the Problems

To attain the above object of the present invention, according to an aspect of the present invention, there is provided an acoustic measurement device including: a sound reception section that includes a plurality of unidirectional microphones, the plurality of microphones being arranged such that the total sum of the unit vectors each facing the maximum sensitivity direction of the microphone is zero; and a calculation section that multiplies respective unit vectors by measurement values of each of the plurality of microphones of the sound reception section and calculates acoustic information by vector-synthesizing the results.

The plurality of microphones of the sound reception section may be arranged such that the total sum of the square of the component of the unit vector of each of the plurality of microphones is equal among the plurality of microphones.

The number of the plurality of microphones of the sound reception section may be larger than the number of space dimensions of the acoustic information to be calculated.

A measurement value of each of the plurality of microphones of the sound reception section may be acoustic pressure, and the calculation section may be multiply the respective unit vectors by acoustic pressure values of each of the plurality of microphones to calculate a particle velocity vector by vector-synthesizing the results.

A measurement value of each of the plurality of microphones of the sound reception section may be acoustic pressure, and the calculation section may calculate omnidirectional acoustic pressure which is a total sum of the acoustic pressure values of each of the plurality of microphones.

The calculation section may multiply the particle velocity vector and the omnidirectional acoustic pressure to calculate acoustic intensity.

A measurement value of each of the plurality of microphones of the sound reception section may be acoustic pressure, and the calculation section may multiply respective unit vectors by the square of the acoustic pressure values of the respective microphones to calculate an acoustic intensity by vector-synthesizing the results.

The sound reception section may include three microphones, and the microphones are arranged such that unit vectors extend from a gravity point of a triangle to vertexes thereof or from vertexes of the triangle to a gravity point thereof.

The sound reception section may include four microphones, and the microphones may be arranged such that unit vectors extend from a gravity point of a triangular pyramid to vertexes thereof or from vertexes of a triangular pyramid to a gravity point thereof.

The plurality of microphones of the sound reception section may be any of a cardioid microphone, a super cardioid microphone, a hyper cardioid microphone, and an ultra cardioid microphone.

Further, according to another aspect of the present invention, there is provided an acoustic measurement device including: a sound reception section that includes a plurality of unidirectional microphones, the plurality of microphones being arranged such that the total sum of the unit vectors each facing the maximum sensitivity direction of the microphone is zero; and a calculation section that sums up measurement values of the respective microphones of the sound reception section to calculate acoustic information.

Advantages of the Invention

The acoustic measurement device of the present invention can reduce the number of microphones while solving a problem of the dependency of interval between microphones on the frequency. Further, the acoustic measurement device can enhance robustness by increasing the number of microphones.

EXPLANATION OF REFERENCE SYMBOLS

1, 2: Microphone (directional microphone)
10: Sound reception section
11 to 13: Microphone (directional microphone)
20: Calculation section
21 to 24: Microphone (directional microphone)

BEST MODE FOR CARRYING OUT THE INVENTION

Figure 1:
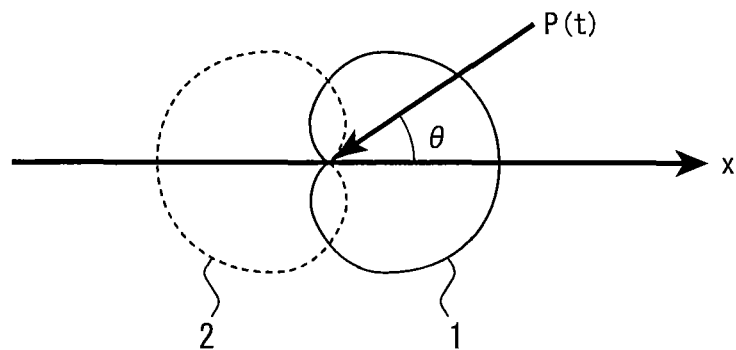
FIG. 1 is a conceptual view visualizing an acoustic field where a single plane wave arrives in a sound reception section.

First, a concept of an acoustic measurement device of the C-C method will be described. FIG. 1 is a conceptual view visualizing an acoustic field where a single plane wave arrives in a sound reception section. In the illustrated acoustic field where a single plane wave P(t) arrives at an angle θ relative to x-direction, particle velocity u(t) in the acoustic field traveling direction is represented by the following formula:

$$u(t)=P(t)/\rho c \quad \text{[Formula 1]}$$

where ρc is acoustic impedance.

Particle velocity $u_x(t)$ in x-direction is represented by the following formula:

$$u_x(t)=-\{P(t)\cos\theta\}/\rho c \quad \text{[Formula 2]}$$

Thus, x-direction component of the acoustic intensity is represented by the following formula:

$$I_x(t)=P(t)u_x(t)=-\{P^2(t)\cos\theta\}/\rho c \quad \text{[Formula 3]}$$

Next, assume that this acoustic field is measured by a pair of unidirectional microphones. In the case where a cardioid microphone is used as the unidirectional microphone, responses $P_1(t)$ and $P_2(t)$ measured by microphones 1 and 2 are represented by the following formulas, respectively:

$$P_1(t)=P(t)(0.5+0.5\cos\theta) \quad \text{[Formula 4]}$$

$$P_2(t)=P(t)(0.5-0.5\cos\theta) \quad \text{[Formula 5]}$$

$P_1(t)$ and $P_2(t)$ are added to thereby obtain omnidirectional acoustic pressure as represented by the following formula:

$$P_1(t)+P_2(t)=P(t) \quad \text{[Formula 6]}$$

A difference between $P_1(t)$ and $P_2(t)$ is represented by the following formula:

$$P_1(t)-P_2(t)=P(t)\cos\theta \quad \text{[Formula 7]}$$

As is clear from a comparison between Formula 7 and Formula 2, the particle velocity $u_x(t)$ in x-direction can be calculated from a difference between responses of the microphones 1 and 2 as represented by the following formula:

$$u_x(t)=-\{P_1(t)-P_2(t)\}/\rho c \quad \text{[Formula 8]}$$

Thus, acoustic intensity component in x-direction is represented by the following formula:

$$\begin{aligned}I_x(t) &= P(t)u_x(t) \\ &= -\{P_1(t)+P_2(t)\}\{P_1(t)-P_2(t)\}/\rho c\end{aligned} \quad \text{[Formula 9]}$$

Formula 9 can be represented as the following formula:

$$I_x(t)=-\{P_1^2(t)-P_2^2(t)\}/\rho c \quad \text{[Formula 10]}$$

The acoustic intensity component in y- or z-direction can be calculated according to the above theory. By synthesizing the acoustic intensity components in x-, y-, and z-directions, acoustic intensity $I(t)$ can be calculated.

As is clear from Formula 9, in the C-C method, the acoustic intensity component of each dimension can be calculated based on the difference between the microphone pair of each dimension and the addition therebetween. In the Japanese Patent Application No. 2007-054909 filed by the same inventor as the present inventor, the acoustic intensity is calculated based on such a theory.

Figure 2:
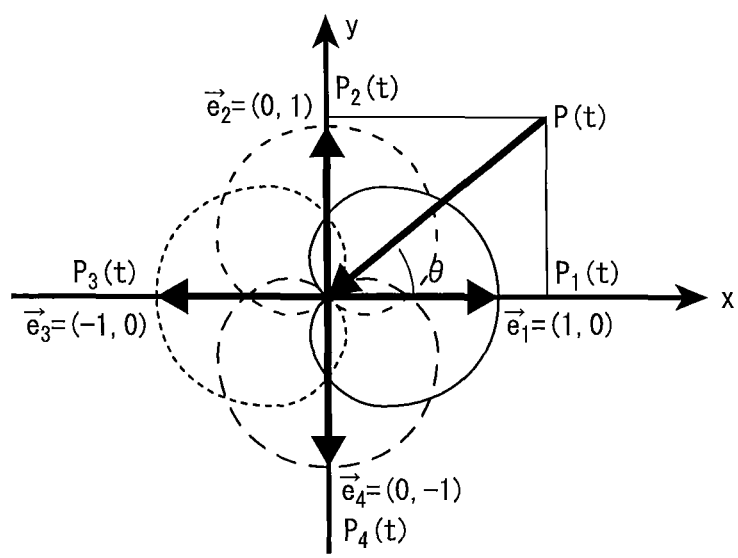
FIG. 2 is a conceptual view in which an acoustic field where a single plane wave arrives in a sound reception section is interpreted with a vector-based approach.

In the following, the principle of calculating the acoustic intensity in the C-C method will be interpreted with a vector-based approach. FIG. 2 is a conceptual view in which an acoustic field where a single plane wave arrives in a sound reception section is interpreted with a vector-based approach. Unit vectors $e_1$ to $e_4$ as illustrated in FIG. 2 each facing the maximum sensitivity direction of the microphone are assumed. For example, the unit vector $e_1$ facing the maximum sensitivity direction of the microphone on the x-axis of the orthogonal coordinate as illustrated has a component of $(1, 0)$.

When an acoustic field where a single plane wave $P(t)$ arrives is assumed, a unidirectional acoustic pressure $P(t)$, a particle velocity vector $u(t)$, and an acoustic intensity $I(t)$ are represented by the following formulas, respectively:

$$P(t) = \frac{2}{n}\sum_{i=1}^{n} P_i(t) \quad \text{[Formula 11]}$$

$$\vec{u}(t) = -\frac{K}{\rho c}\sum_{i=1}^{n}\{P_i(t)\cdot\vec{e}_i\} \quad \text{[Formula 12]}$$

$$\vec{I}(t) = -\frac{2K}{n}\cdot\frac{1}{\rho c}\sum_{i=1}^{n} P_i(t) \times \sum_{i=1}^{n}\{P_i(t)\cdot\vec{e}_i\} \quad \text{[Formula 13]}$$

where n is the number of microphones (channels), and K is a coefficient of particle velocity normalization which varies depending on the number of channels or type of the microphone.

As is clear from the above formulas, when the acoustic field is interpreted with a vector-based approach, a particle velocity vector is represented as one obtained by multiplying (weighting) respective unit vectors by the measurement values of the respective microphones and by vector-synthesizing the results. That is, when the particle velocity vector is calculated as acoustic information, the unit vectors are multiplied by the acoustic pressure values of the respective microphones and then the results are vector-synthesized.

Further, the omnidirectional acoustic pressure is represented as one obtained by the total sum of the acoustic pressure values of the respective microphones. That is, when the omnidirectional acoustic pressure is calculated as acoustic information, the total sum of the acoustic pressure values of the respective microphones is calculated.

The acoustic intensity is represented by a product of the thus calculated particle velocity vector and omnidirectional acoustic pressure. That is, the acoustic intensity is calculated as acoustic information, the particle velocity vector and the omnidirectional acoustic pressure are multiplied.

Further, when the squared acoustic pressure which is the square of the acoustic pressure is considered, acoustic intensity $I(t)$ is represented by the following formula:

$$\vec{I}(t) = -\frac{G}{n}\cdot\frac{1}{\rho c}\sum_{i=1}^{n}\{P_i^2(t)\cdot\vec{e}_i\} \quad \text{[Formula 14]}$$

where G is a normalization coefficient which varies depending on the number of channels or types of the microphone.

As is clear from the above formulas, when the squared acoustic pressure is considered in the vector-based interpretation of the acoustic field, it is possible to directly calculate the acoustic intensity without calculating the particle velocity vector. That is, when the acoustic intensity is calculated as acoustic information, the unit vectors are multiplied by the squared acoustic pressure and then the results are vector-synthesized.

The vector-synthesis method used in the acoustic measurement device of the C-C method may be performed according to the theory as described above. The vector-synthesis includes not only addition of vectors but also subtraction between vectors when viewed from the opposite direction.

In the case where the vector-synthesis method of the acoustic measurement device according to the present invention is employed, the following conditions are imposed on the unit vector facing the maximum sensitivity direction of the microphone.

(1) Condition that the unit vector facing the maximum sensitivity direction of each microphone is spatially balanced as represented by the following formula. That is, the plurality of microphones should be arranged such that the total sum of the unit vectors is zero.

$$\sum_{i=1}^{n}\vec{e}_i = 0 \quad \text{[Formula 16]}$$

(2) Condition that contributions of respective dimensions are equal as represented by the following formula. That is, the plurality of microphones should be arranged such that the total sum of the square of the component of the unit vector of each of the plurality of microphones is equal among the plurality of microphones.

$$\sum_{i=1}^{n} x_i^2 = \sum_{i=1}^{n} y_i^2 = \sum_{i=1}^{n} z_i^2 \quad \text{[Formula 17]}$$

(3) Condition that the number of microphones is larger than the number of space dimensions of the vector of the acoustic information to be calculated.

When the plurality of microphones satisfy the above conditions, it is possible to employ the vector-synthesis method of the acoustic measurement device according to the present invention. However, the condition of (2) is not essential but even if the microphones are arranged such that contributions of respective dimensions are not equal, serious problems do not occur by making appropriate correction as long as the condition of (1) is satisfied.

Embodiments

Figure 3:
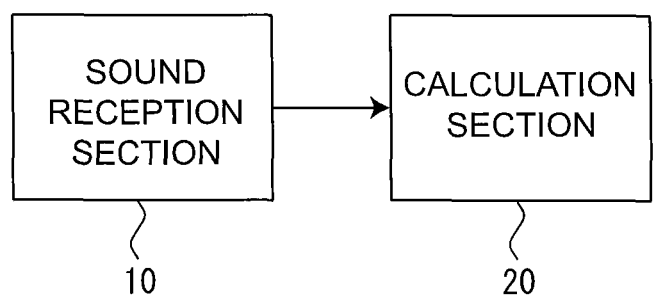
FIG. 3 is a block diagram for explaining an acoustic measurement device according to the present invention.

Hereinafter, preferred embodiments for practicing the present invention will be described with reference to the accompanying drawings. FIG. 3 is a block diagram for explaining the acoustic measurement device according to the present invention. As illustrated, the acoustic measurement device of the present invention mainly includes a sound reception section 10 and a calculation section 20. The sound reception section 10 has a plurality of microphones, each of which has unidirectionality. The plurality of microphones are arranged such that the above conditions (1) to (3) are satisfied, i.e., such that the total sum of the unit vectors each facing the maximum sensitivity direction of the microphone is zero and that the total sum of the square of the component of the unit vector of each of the plurality of microphones is equal among the plurality of microphones. The arrangement position of the microphones will be described later.

The microphone to be used is a microphone having unidirectionality. More specifically, examples of the microphone to be used include a cardioid microphone, a super cardioid microphone, a hyper cardioid microphone, and an ultra cardioid microphone. The response (acoustic pressure) characteristics measured by each microphone are appropriately changed depending on the directionality of the microphone to be used.

The information measured by the sound reception section is supplied to the calculation section 20. The calculation section 20 is realized by, e.g., a calculation unit, such as a personal computer or a digital signal processor (DSP). The calculation section 20 calculates the omnidirectional acoustic pressure, the particle velocity vector or the acoustic intensity depending on the purpose of use, etc. of the acoustic measurement device. For example, when the omnidirectional acoustic pressure is calculated, Formula 11 is used to sum up the acoustic pressure values of the respective microphones. When the particle velocity vector is calculated, Formula 12 is used to multiply respective unit vectors by the acoustic pressure values of the respective microphones, and then the results are vector-synthesized. Further, when the acoustic intensity is calculated, the particle velocity vector and the omnidirectional acoustic pressure are multiplied. These calculations may be combined appropriately.

Further, the calculation section 20 may calculate the acoustic intensity, according to Formula 14, by squaring the respective acoustic pressure values of the microphones, by multiplying the respective unit vectors by the squared acoustic pressure values, and by vector-synthesizing the results.

Figure 4:
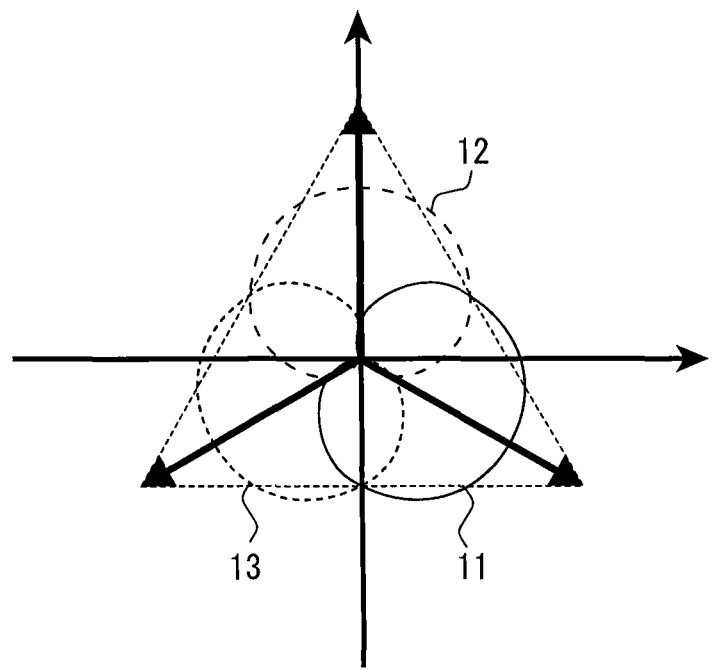
FIG. 4 is a view for explaining a first embodiment of the acoustic measurement device of the present invention.

Hereinafter, the arrangement position of the plurality of microphones will be described more in detail. FIG. 4 is a view for explaining a first embodiment of the acoustic measurement device of the present invention. It should be noted that FIG. 4 does not represent the outer appearance of each microphone but represent only the directionality thereof. The acoustic measurement device of the first embodiment is configured to measure two-dimensional acoustic information. As illustrated, in the first embodiment of the acoustic measurement device of the present invention, the sound reception section is constituted by three microphones: a first microphone 11, a second microphone 12, and a third microphone 13. Arrows each facing the maximum sensitivity direction of the microphone represent unit vectors. The microphones are arranged such that unit vectors extend from the gravity point of the triangle to the vertexes thereof. The directions of the unit vectors may be reversed. That is, the microphones are arranged such that unit vectors extend from the vertexes of the triangle to the gravity point thereof. As described above, in the case where three microphones are used, the microphones are arranged such that unit vectors extend from the gravity point of the triangle to the vertexes thereof as long as the microphones are arranged such that the total sum of the unit vectors each facing the maximum sensitivity direction of the microphone is zero and that the total sum of the square of the component of the unit vector of each of the plurality of microphones is equal among the plurality of microphones.

Such arrangement of the microphones allows the acoustic field to be interpreted with a vector-based approach in the acoustic measurement device of the present invention. With this configuration, in the acoustic measurement device of the present invention, it is possible to reduce the number of microphones required for measuring the two-dimensional particle velocity vector or the two-dimensional acoustic intensity from at least four in the conventional configuration to at least three. Even with this configuration, it is possible to easily calculate the particle velocity vector or the acoustic intensity by using Formula 12 or Formula 13.

In the two-dimensional measurement, the number of microphones is not limited to three, but it is possible to use four, five or more microphones depending on the purpose of use. To satisfy the above conditions (1) to (3) when four microphones are used, the four microphones are arranged such that respective pairs of microphones arranged in 180 degrees opposite direction are arranged such that the lines connecting the respective pairs of microphones cross each other in the x- and y-axis directions about the coordinate origin.

In the acoustic measurement device of the two-dimensional the C-C method, it is possible to ignore an inherent mismatch in the phase characteristics existing between the microphones only when four or more microphones are used. Therefore, strictly speaking, in the case where the sound reception section is constituted by three microphones, measurement error may occur due to the mismatch in the phase characteristics. In this case, however, it is possible to obtain more satisfactory effect than in the conventional P-P method.

The interval between the microphones gives no influence in the case of a single plane wave acoustic field. In the case of a plurality of interference acoustic fields, it is preferable to reduce the interval.

Further, in the acoustic measurement device of the present invention, a large number of microphones may be used to constitute the sound reception section. In this case, even if one microphone fails to operate properly, the function of the acoustic measurement device can be ensured to some extent although the measurement accuracy is decreased. Thus, the acoustic measurement device of the present invention can be applied to a usage requiring robustness.

Figure 5:
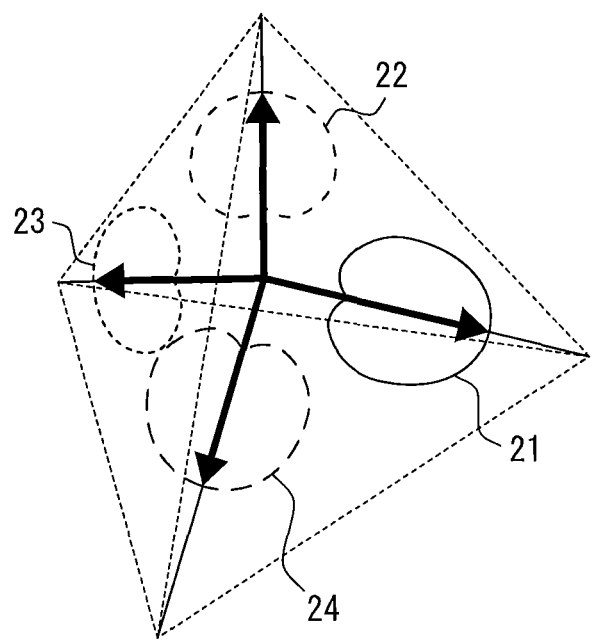
FIG. 5 is a view for explaining a second embodiment of the acoustic measurement device of the present invention.

Next, a second embodiment of the acoustic measurement device according to the present invention will be described. FIG. 5 is a view for explaining the sound reception section of the second embodiment of the acoustic measurement device of the present invention. It should be noted that FIG. 5 does not represent the outer appearance of each microphone but represent only the directionality thereof. The acoustic measurement device of the first embodiment is configured to measure two-dimensional acoustic information, while the acoustic measurement device of the second embodiment is configured to measure three-dimensional acoustic information. As illustrated, in the second embodiment of the acoustic measurement device of the present invention, the sound reception section is constituted by four microphones: a first microphone 21, a second microphone 22, a third microphone 23, and a fourth microphone 24. Arrows each facing the maximum sensitivity direction of the microphone represent unit vectors. The microphones are arranged such that unit vectors extend from the gravity point of the triangular pyramid (tetrahedron) to the vertexes thereof. The directions of the unit vectors may be reversed. That is, the microphones are arranged such that unit vectors extend from the vertexes of the triangular pyramid to the gravity point thereof. As described above, in the case where the four microphones are used, the microphones are arranged such that unit vectors extend from the gravity point of the regular tetrahedron to the vertexes thereof as long as the microphones are arranged such that the total sum of the unit vectors each facing the maximum sensitivity direction of the microphone is zero and that the total sum of the square of the component of the unit vector of each of the plurality of microphones is equal among the plurality of microphones.

Also in the second embodiment of the acoustic measurement device of the present invention, the acoustic field can be interpreted with a vector-based approach, and it is possible to reduce the number of microphones required for measuring the three-dimensional particle velocity vector or the three-dimensional acoustic intensity from at least six in the conventional configuration to at least four. Even with this configuration, it is possible to easily calculate the particle velocity vector or acoustic intensity by using Formula 12 or Formula 13.

Here, the second embodiment of the acoustic measurement device of the present invention is analyzed by simulation. First, a simple three-dimensional acoustic field where a sine wave of 100 Hz arrives as a single plane wave is assumed. Then, responses of four microphones obtained when the arrival angle of the acoustic field to the sound reception section is changed in 10-degree increments between 0 degree and 350 degrees are calculated, and the obtained response waveforms corresponding to the four channels are used to calculate the acoustic intensities according to Formula 13. Further, the obtained acoustic intensities are averaged to calculate the three-dimensional average intensity vector, whereby arrival direction of sound from a sound source and the absolute value of the acoustic intensity are calculated. The obtained results are illustrated in FIGS. 6 to 8.

Figure 6:
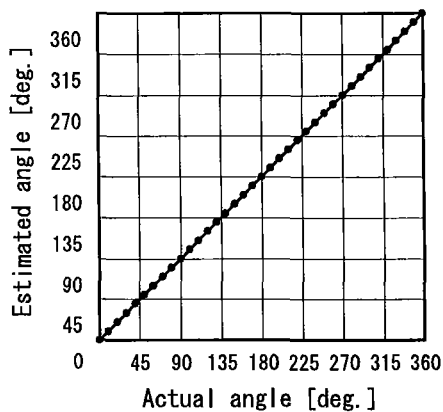
FIG. 6 is a simulation result in the second embodiment of the acoustic measurement device of the present invention in the case where the arrival direction of sound from a sound source is changed relative to the horizontal angle.

FIG. 6 is a simulation result in the second embodiment of the acoustic measurement device of the present invention in the case where the arrival direction of sound from a sound source is changed relative to the horizontal angle. The horizontal axis represents the actual arrival direction of sound, and vertical axis represents the calculated arrival direction of sound. FIG. 7 is a simulation result in the second embodiment of the acoustic measurement device of the present invention in the case where the arrival direction is changed relative to the elevation angle. Also in this case, the horizontal axis represents the actual arrival direction of sound, and the vertical axis represents the calculated arrival direction of sound. FIG. 8 is a simulation result in the configuration of the second embodiment of the acoustic measurement device of the present invention, in which the absolute value of the acoustic intensity is calculated. The horizontal axis represents the actual arrival direction of sound, and vertical axis represents the calculated absolute value of the acoustic intensity.

Figure 7:
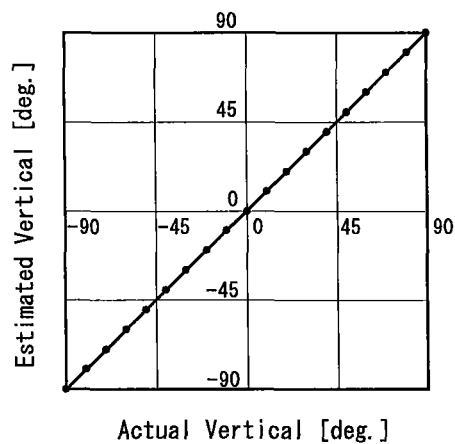
FIG. 7 is a simulation result in the second embodiment of the acoustic measurement device of the present invention in the case where the arrival direction is changed relative to the elevation angle.
Figure 8:
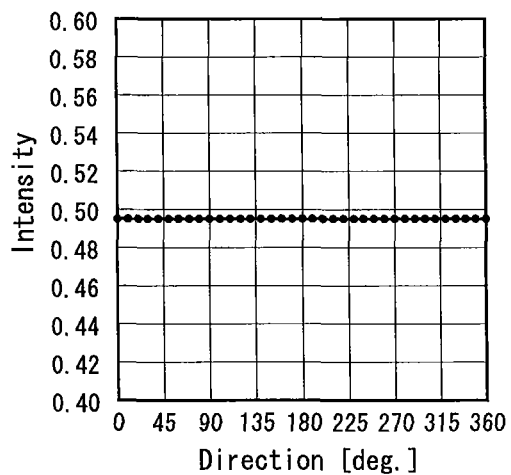
FIG. 8 is a simulation result in which the absolute value of the acoustic intensity is calculated in the second embodiment of the acoustic measurement device of the present invention.

As is clear from FIGS. 6 to 8, the three-dimensional arrival direction has been analyzed with sufficient accuracy. Further, the absolute value remains constant regardless of the arrival direction of sound, indicating that analysis can be made without eccentricity with respect to the direction of a sound source.

As described above, in the acoustic measurement device of the present invention, the measurement theory based on the C-C method is interpreted with a vector-based approach, so that the dependency of the interval between the microphones on the frequency, which is a product of the C-C method, does not exist. Further, the plurality of microphones need not be arranged in 180 degrees opposite direction in terms of directionality on the respective axes of an orthogonal coordinate system, so that the number of microphones used can be reduced.

Further, in the acoustic measurement device of the present invention, the microphones need not be arranged in 180 degrees opposite direction in terms of directionality, and microphones may be arranged diagonally with respect to each other, so that terminals generally provided at positions opposite to the sound reception sides of the microphones are difficult to physically interfere with each other. This facilitates the arrangement of the microphones and allows a reduction of the microphone size.

In the three-dimensional measurement, the number of microphones is not limited to four, but it is possible to use five, six or more microphones depending on the purpose of use. To satisfy the above conditions (1) to (3) when six microphones are used, the six microphones are arranged such that respective pairs of microphones arranged in 180 degrees opposite direction are arranged such that the lines connecting the respective pairs of microphones cross each other in the x-, y-, and z-axis directions about the coordinate origin.

In the acoustic measurement device of three-dimensional C-C method, it is possible to ignore an inherent mismatch in the phase characteristics existing between the microphones only when six or more microphones are used. Therefore, strictly speaking, in the case where the sound reception section is constituted by four microphones, measurement error may occur due to the mismatch in the phase characteristics. In this case, however, it is possible to obtain more satisfactory effect than in the conventional P-P method.

The interval between the microphones gives no influence in the case of a single plane wave acoustic field. However, in the case of a plurality of interference acoustic fields, it is preferable to reduce the interval.

Further, in the three-dimensional acoustic measurement device of the present invention, a large number of microphones may be used to constitute the sound reception section. In this case, even if one microphone fails to operate properly, the function of the acoustic measurement device can be ensured to some extent although the measurement accuracy is decreased. Thus, the acoustic measurement device of the present invention can be applied to a usage requiring robustness.

The acoustic measurement device of the present invention is not limited to the illustrative examples but it is a matter of course that modifications may be made without departing from the spirit of the present invention.

What is claimed is:

1. An acoustic measurement device comprising:
   a sound reception section that includes a plurality of unidirectional microphones that are configured to produce measurement values, the plurality of the unidirectional microphones being arranged such that a total sum of unit vectors of the plurality of the unidirectional microphones is zero, wherein each of the unit vectors faces a maximum sensitivity direction of each unidirectional microphone; and
   a calculation section for calculating an acoustic information vector by
   arithmetically adding each of the measurement values produced by the plurality of the unidirectional microphones of the sound reception section to produce an additional value,
   multiplying respective unit vectors by each of the respective measurement values to produce multiplied vectors,
   performing a vector addition of each of the multiplied vectors to produce a resultant vector, and
   performing a vector multiplication of the additional value by the resultant vector to produce the acoustic information vector.

2. The acoustic measurement device according to claim 1, in which the plurality of the unidirectional microphones of the sound reception section are arranged such that the total sum of a square of a component of the unit vector of each of the plurality of the unidirectional microphones is equal with each other.

3. The acoustic measurement device according to claim 1, in which the number of the plurality of the unidirectional microphones of the sound reception section is larger than the number of space dimensions of the acoustic information vector to be calculated.

4. The acoustic measurement device according to claim 1, in which a measurement value of each of the plurality of the unidirectional microphones of the sound reception section is an acoustic pressure value, and
   the calculation section further calculates a particle velocity vector by performing an addition of each of the multiplied vectors.

5. The acoustic measurement device according to claim 4, in which a measurement value of each of the plurality of the unidirectional microphones of the sound reception section is an acoustic pressure value, and
   the calculation section calculates omnidirectional acoustic pressure by adding each of the acoustic pressure values of the plurality of the unidirectional microphones.

6. The acoustic measurement device according to claim 5, in which the calculated acoustic information vector is an acoustic intensity vector.

7. The acoustic measurement device according to claim 1, in which a measurement value of each of the plurality of the unidirectional microphones of the sound reception section is an acoustic pressure value, and
   the calculation section calculates acoustic intensity vector by multiplying the respective unit vectors with a square of the acoustic pressure values of the respective unidirectional microphones to produce square multiplied vectors and performing a vector addition on each of the square multiplied vectors.

8. The acoustic measurement device according to claim 1, in which the sound reception section includes the plurality of the unidirectional microphones comprising three unidirectional microphones, and the three unidirectional microphones are arranged such that the unit vectors extend from a gravity point of a triangle to vertexes of the triangle or from vertexes of the triangle to a gravity point of the triangle.

9. The acoustic measurement device according to claim 1, in which the sound reception section includes the plurality of the unidirectional microphones comprising four unidirectional microphones, and the four unidirectional microphones are arranged such that the unit vectors extend from a gravity point of a triangular pyramid to vertexes of the triangle pyramid or from vertexes of a triangular pyramid to a gravity point of the triangle pyramid.

10. The acoustic measurement device according to claim 1, in which the plurality of the unidirectional microphones of the sound reception section are any of a cardioid microphone, a super cardioid microphone, a hyper cardioid microphone, and an ultra cardioid microphone.

11. The acoustic measurement device according to claim 1, in which the sound reception section includes the plurality of unidirectional microphones comprising four unidirectional microphones, and the four unidirectional microphones are arranged such that the unit vectors extend from a single common point of a triangular pyramid toward vertexes of the triangular pyramid.

12. The acoustic measurement device according to claim 1, wherein:
   the measurement value comprises unidirectional acoustic pressure; and
   the resultant vector is a particle velocity vector.

13. The acoustic measurement device according to claim 12, wherein the additional value obtained by the calculation section comprising
   omnidirectional acoustic pressure; and
   multiply the particle velocity vector with the omnidirectional acoustic pressure to obtain the acoustic information vector that is acoustic intensity vector.

* * * * *